US008024239B2

(12) United States Patent
Shirazi

(10) Patent No.: US 8,024,239 B2
(45) Date of Patent: Sep. 20, 2011

(54) AQUA INDEX

(75) Inventor: Yaacov Shirazi, Petach Tikva (IL)

(73) Assignee: Aqua Index, Petach Tikva (IL)

( * ) Notice: Subject to any disclaimer, the term of this patent is extended or adjusted under 35 U.S.C. 154(b) by 401 days.

(21) Appl. No.: 12/194,551

(22) Filed: Aug. 20, 2008

(65) Prior Publication Data

US 2009/0055294 A1 Feb. 26, 2009

Related U.S. Application Data

(60) Provisional application No. 60/956,933, filed on Aug. 21, 2007.

(51) Int. Cl.
*G06Q 40/00* (2006.01)
(52) U.S. Cl. ............................ 705/30; 705/35; 705/36 R
(58) Field of Classification Search .................... 705/30, 705/37, 39, 36 R, 36, 35; 250/339.11, 339.12
See application file for complete search history.

(56) References Cited

U.S. PATENT DOCUMENTS

| | | | | |
|---|---|---|---|---|
| 4,344,847 A * | 8/1982 | Grenet | ............................ | 203/11 |
| 5,818,045 A * | 10/1998 | Mark et al. | ............... | 250/339.12 |
| 6,950,806 B2 * | 9/2005 | Dines et al. | ....................... | 705/37 |
| 7,505,921 B1 * | 3/2009 | Lukas et al. | ...................... | 705/26 |
| 7,520,667 B2 * | 4/2009 | Pahlsson et al. | ................. | 374/45 |
| 2002/0062594 A1 * | 5/2002 | Erickson | ......................... | 47/48.5 |
| 2002/0188459 A1 * | 12/2002 | Erickson | ............................ | 705/1 |
| 2003/0014342 A1 * | 1/2003 | Vande Pol | ......................... | 705/36 |
| 2004/0181528 A1 * | 9/2004 | Tirinato et al. | .................... | 707/8 |
| 2005/0246271 A1 * | 11/2005 | Erwin | ............................ | 705/39 |
| 2006/0085152 A1 * | 4/2006 | Sugiyama et al. | ............... | 702/81 |
| 2007/0078790 A1 * | 4/2007 | Kalyan | ............................ | 705/80 |
| 2007/0265523 A1 * | 11/2007 | Pahlsson et al. | ............... | 600/412 |
| 2008/0059358 A1 * | 3/2008 | Wardley et al. | ................... | 705/37 |
| 2008/0306861 A1 * | 12/2008 | Fell et al. | ......................... | 705/37 |
| 2008/0313014 A1 * | 12/2008 | Fell et al. | ......................... | 705/10 |
| 2009/0063362 A1 * | 3/2009 | O'Connell et al. | .......... | 705/36 R |
| 2009/0063364 A1 * | 3/2009 | O'Connell et al. | .......... | 705/36 R |
| 2009/0119200 A1 * | 5/2009 | Riviere | ............................ | 705/37 |
| 2009/0132411 A1 * | 5/2009 | Drouin et al. | ..................... | 705/37 |
| 2009/0132434 A1 * | 5/2009 | Drouin et al. | ................ | 705/36 R |
| 2009/0248561 A1 * | 10/2009 | McIntosh | .......................... | 705/35 |
| 2010/0023340 A1 * | 1/2010 | Chowdhary et al. | ............... | 705/1 |
| 2010/0063902 A1 * | 3/2010 | Constantz et al. | ............... | 705/28 |
| 2010/0121755 A1 * | 5/2010 | Spurgin et al. | ................... | 705/37 |

OTHER PUBLICATIONS

Edmund G Archuleta. "Financial practices in public utilities." American Water Works Association. Journal 92.1 (2000): 60-61. ABI/INFORM Trade & Industry, ProQuest. Web. Nov. 1, 2010.*
Anthony DePalma. "Free Trade in Fresh Water? Canada Says No and Halts Exports." New York Times Mar. 8, 1999, Late Edition (East Coast): Banking Information Source, ProQuest. Web. Nov. 1, 2010.*
Saijel Kishanand Madelene Pearson. (Jun. 26, 2006). As need grows, value of water flows uphill Marketplace by Bloomberg :[3 Edition]. International Herald Tribune,p. 15. Retrieved May 24, 2011, from ProQuest Newsstand. (Document ID: 1066249961).*

(Continued)

*Primary Examiner* — Matthew S Gart
*Assistant Examiner* — Olusegun Goyea
(74) *Attorney, Agent, or Firm* — Mark M. Friedman

(57) ABSTRACT

A method and system for computing a stable index value of a regulated substance by computing a virtual value of the substance based on the value of a freely marketed product of the substance. Particularly the invention may be applied to develop a stable investment instrument for investing in fresh water.

32 Claims, 4 Drawing Sheets

OTHER PUBLICATIONS

Eric Uhlfelder. (Apr. 2006). Liquid assets. Institutional Investor,106-107. Retrieved May 24, 2011, from ABI/INFORM Global. (Document ID: 1040671571).*

ISE To Launch New Water Index. (Jan. 5). Business Wire,1. Retrieved May 24, 2011, from Business Dateline. (Document ID: 958344731).*

"Inventing Water's Future": published by Firbes.com Jun. 19, 2008 by William Pentland.

Task Force on Financing Water for All—Report 1. Enhancing Access to Finance for Local Governements—Financing Water for Agriculture by Paul Hofwegen, 2006.

* cited by examiner

Figure 3

| | Global Data | | | | | | |
|---|---|---|---|---|---|---|---|
| | | Export | Domestic | Desalinate | Bottled | purify | Food Crop: biofuels |
| | symbol | Wa | Wq | Wu | Wh | Wi | Wt Wb —362 |
| | portion | 0.05 | 0.5 | 0.0995 | 0.0005 | 0.05 | 0.2 0.1 |

Fresh Export

| | | Turkey | Canada | Norway | | | |
|---|---|---|---|---|---|---|---|
| | portion | 0.4 | 0.4 | 0.2 | | | |
| | price | $1.20 | $0.70 | $0.80 | | | |
| value | w*a | 0.48 | 0.28 | 0.16 | | | |
| $0.92 | | | | | | | | domestic

| | | US city | Isreal | Russia | Mexico | Brazil —363a | |
|---|---|---|---|---|---|---|---|
| | portion | 0.3 | 0.05 | 0.1 | 0.3 | 0.25 | |
| | price | $0.40 | $1.80 | $0.25 | $0.65 | $1.35 | |
| value | w*q | 0.12 | 0.09 | 0.025 | 0.195 | 0.3375 —364a | |
| $0.77 | | | | | | | | desalinate

| | | city | industr | vacation | u: OPEC u3 —363b | | |
|---|---|---|---|---|---|---|---|
| | portion | 0.2 | 0.5 | 0.3 | 0.3 | | |
| | price | $0.80 | $1.50 | $4.00 | | | |
| value | w*u | 0.16 | 0.75 | 1.2 —364b | | | |
| $2.11 | | | | | | | | bottled

| | | store US | deliver US | store EEU —363c | | | |
|---|---|---|---|---|---|---|---|
| | portion | 0.4 | 0.4 | 0.2 | | | |
| | price | $200.00 | $150.00 | $300.00 | | | |
| value | w*h | 80 | 60 | 60 —364c | | | |
| $200.00 | | | | | | | | purify

| | | city | industr | vacation | OPEC —363d | | |
|---|---|---|---|---|---|---|---|
| | portion | 0.5 | 0.25 | 0.25 | | | |
| | price | $0.50 | $3.50 | $2.50 | | | |
| value | w*.i | 0.25 | 0.875 | 0.625 —364d | | | |
| $1.75 | | | | | | | |

Food Crops

| | | corn NY t1 | coffee t2 | wheat NY t3 —363e | | | |
|---|---|---|---|---|---|---|---|
| | portion | 0.27 | 0.5 | 0.23 | | | |
| virtual value | price | $0.20 | $0.15 | $0.30 | | | |
| $0.20 | w*t | 0.054 | 0.075 | 0.069 —364e | | | |

Biofuels

| | | ethanol b1 | biodeisel b.biomethane b3 —363f | | | | |
|---|---|---|---|---|---|---|---|
| | portion | 0.6 | 0.3 | 0.1 | | | |
| virtual value | price | $0.22 | $0.15 | $0.43 | purify | bottled | food crops biofuels |
| $0.22 | w*t | 0.132 | 0.045 | 0.043 —364f | 0.05 | 0.0005 | 0.2 0.1 |

Total

| | | Fresh Exp | domestic | desalinate | bottled | purify | food crops biofuels |
|---|---|---|---|---|---|---|---|
| | portion | 0.05 | 0.5 | 0.0995 | 0.0005 | 0.05 | 0.2 0.1 |
| | value | $0.92 | $0.77 | $2.11 | $200.00 | $1.75 | $0.20 $0.22 |
| | w*x | 0.046 | 0.38375 | 0.209945 | 0.1 | 0.0875 | 0.0396 0.022 |
| | | N | D | E | | | |
| 366— | $0.89 | 0.01 | 0.03 | -0.015 | | | |
| 367— | $0.91 | X 1.05 | | | | | |
| | $0.96 | Z 1.12 | | | | | |
| 369— | $1.07 | | | | | | |

368—  365a—  365b—

AQUA INDEX

This patent application claims the benefit of U.S. Provisional Patent Application No. 60/956,933, filed Aug. 21, 2007

FIELD AND BACKGROUND OF THE INVENTION

Various methods and systems for investing in commodities are possible, and particularly, methods and systems may determine of a stable index price and permit the use of a commodity as an investment for financiers and permit the holder of the commodity to generate capital to develop the commodity.

Many investors choose to invest in commodities as a hedge against inflation. In order to make commodities investment more secure, many financiers prefer to invest in an indexed commodity. The index gives a composite representative price based on the price at multiple suppliers. This allows the investor to invest in the commodity without being exposed to local instabilities in the markets.

Particularly, fresh water, being an essential and irreplaceable commodity that is becoming scarcer, is a very desirable commodity for investment. Furthermore, investment money is also needed for building plants for acquiring, purifying and distributing water. On the other hand, the market for water is strongly affected by local factors and prices vary wildly from place to place. Also temporally, supply and demand for water may vary very wildly due to short-term events. Prices of water in the USA are from 0.16 to 1.35 usd/m3 in Germany 1.80 usd/m3, in Finland 0.50 usd/m3, and 4.00 usd/m3 for desalinated water in Saudi Arabia. Thus in order to invest safely in water an investor needs additional protection.

In many water rich areas, water is not developed and squandered because although water is a very valuable commodity, water has no market value and cannot currently be sold, exploited or used as security for loans. Therefore water holders (e.g. regional governments or landholders having water resources) often choose to develop industries that provide quick profits even when these industries destroy valuable water resources. If a world water market were developed, water resources would become a valuable asset useful as for guaranteeing loans and this would encourage improved protection of water resources. Furthermore, developing a water market would make it possible for water holders to generate investment capital necessary to develop water resources.

A major problem in developing an integrated market for water is connected to the highly regulated nature of water as a commodity. The political and economic importance of water limits the potential of trade as a policy tool to mitigate water scarcity. National and local governments use exit fees, fixed taxing and progressive taxing of water on one hand, and subsidization of water on the other hand to protect local water supplies or encourage water intensive industries (like agriculture). Having a wide range of prices (e.g. 0.16-4.00 usd/m3) and exit fees (e.g. 0-70% in different provinces in Australia), and tax rates (e.g. 10-50% progressive tax and 30% subsidization for agriculture in Israel), no one has been able to build a stable international market for water.

This has created a situation in which, although fresh water is recognized as a commodity by the European Court and although fresh water is an essential commodity with limited supply and increasing demand (and thus a desirable investment [for example see the article "Inventing Water's Future" published by Forbs.com Jun. 19, 2008 by William Pentland]), and although there is a great need for investment capital to develop water resources [for example see World Water Council, World Water Forum Task Force on Financing Water for All, Report 1, by Paul Van Hofwegen, 2006] no one has been able to build a stable investment instrument for water. There is no integrated world market for water as there is for publicly traded commodities like wheat, corn, oil or gold. There is no investment instrument based on water price (S & P using 50 companies value). There is no public trading of a water index or water futures or water as a commodity on any major stock exchange.

There is thus a widely recognized need for, and it would be highly advantageous to have an investment instrument for water that is based on a stable free market price.

SUMMARY OF THE INVENTION

Various methods and systems are possible for providing an investment instrument and method for a investing. Particularly, a system or method may facilitate investment in a substance by determining a free market price of the substance based on a virtual value of the substance as the value is reflected in the price of a freely traded product.

An embodiment of an instrument for stable investment (a financial instrument may include for example a bond, a certificate, a futures, a stock, a basket) in a commodity may include a collateral having a valuable substance. The instrument may further include a virtual value of the substance calculated according to an influence of a price of the substance on the price of the product.

In an embodiment of an investment instrument the valuable substance may be regulated such that a price of the substance in trading is strongly affected by non-market factors (such as government subsidies, unusual taxes [e.g. excise taxes, fixed taxes, progressive taxes and export fees] or controls) while the product from which the virtual value is calculated may be a publicly traded commodity with a free market price.

In an embodiment of an investment instrument the substance of value in the collateral may be fresh water.

In an embodiment of an investment instrument the virtual value is calculated from one or more of an agricultural commodity, a manufactured commodity and a fuel (for example a biofuel).

In an embodiment of an investment instrument the virtual value of the substance may further depend on one or more of the following factors: the quantity of the substance in the product, the quantity of the substance utilized to produce the product, and the quantity of an output produced from the product (for example the quantity of energy output from combusting the product, a quantity of the substance produced as a byproduct of utilizing the product).

In an embodiment of an investment instrument the virtual value may further on a market weight of the product.

An embodiment of a method of investing may include calculating an index value of a substance. The index value may be at least partially dependent on a virtual value of the substance. The virtual value may be computed based on the influence of the value of the substance on the price of a product of the substance.

An embodiment of a method of investing may further include acquiring a right to a collateral containing the substance according to the index value of the substance.

In an embodiment of a method of investing, trade may be regulated in the substance for which the index price is calculated whereas the product from which the virtual price is calculated may be a publicly traded commodity.

In an embodiment of a method of investing, the substance for which an index price is calculated may be fresh water.

In an embodiment of a method of investing, the product from which the virtual price is calculated may be one or more of the following an agricultural commodity, a manufactured commodity, and a fuel.

In an embodiment of a method of investing, calculating the index value may employ one or more of evaluating a quantity of the substance contained in the product, evaluating a quantity of the substance utilized to produce the product and evaluating a quantity of an output from the product.

An embodiment of a method of trading a collateral may include determining a market value of the collateral based on an index value of a substance of the collateral. The index value may be calculated using a formula that is at least partially dependent on a virtual value of the substance in a product.

An embodiment of a method of trading a collateral may further include marketing a right to the collateral according to the market value of the collateral.

In an embodiment of a method of trading a collateral, trade in the substance of the collateral may be regulated whereas the product used for calculation of the virtual value may be a publicly traded commodity.

In an embodiment of a method of trading a collateral, the substance of the collateral may be fresh water.

In an embodiment of a method of trading a collateral, the product may include one or more of an agricultural commodity, a manufactured commodity, and a fuel.

In an embodiment of a method of trading a collateral, the virtual value may further depend one or more of a quantity of the substance in the product, a quantity of the substance utilized to produce the product, and a quantity of an output from the product.

An embodiment of a system to manage an investment may include a memory configured to store a virtual value of a substance, and a processor. The processor may be configured for computing the virtual value of the substance in at least one product, and calculating an index value of the collateral. The index value of the substance may be partially dependent on the virtual value of the substance.

In an embodiment of a system to manage an investment the substance may be a regulated commodity and the product may be a freely traded commodity.

In an embodiment of a system to manage an investment the substance may be fresh water.

In an embodiment of a system to manage an investment the product may include one or more of an agricultural commodity, a manufactured commodity, and a fuel.

In an embodiment of a system to manage an investment the memory may be further configured to store one or more of the quantity of the substance in the product, the quantity of the substance utilized to produce the product, and the quantity an output from the product.

Terminology

The following terms are used in this application in accordance with their plain meanings, which are understood to be known to those of skill in the pertinent art(s). However, for the sake of further clarification in view of the subject matter of this application, the following explanations, elaborations and exemplifications are given as to how these terms may be used or applied herein. It is to be understood that the below explanations, elaborations and exemplifications are to be taken as exemplary or representative and are not to be taken as exclusive or limiting. Rather, the terms discussed below are to be construed as broadly as possible, consistent with their ordinary meanings and the below discussion.

Acquiring a right to a collateral means receiving entitlement to derive a benefit from the collateral.

Marketing a right to a collateral means conveying entitlement to benefit from the collateral in return for some payment or benefit.

A product of a substance is an item or material, associated with the utilization of the substance (for example the substance may be utilized in production of the product or in order to bring the item to market). (As a result, the cost of the product may be influenced by the cost of the substance. A substance may also be considered a product of itself).

The substance of a collateral is something of general value that can be derived from the collateral.

A virtual value of a substance is a value of the substance obtained by calculating the influence of the value of the substance on the cost of a product of the substance or the influence of the cost of the substance on the cost of a product that is a substitute for a commodity.

BRIEF DESCRIPTION OF THE DRAWINGS

Various embodiments of a method and system for investment are herein described, by way of example only, with reference to the accompanying drawings, where:

FIG. 3 is an illustration of a computation of a price index;

DESCRIPTION OF THE PREFERRED EMBODIMENTS

The principles and operation of a method and system for investment according to various embodiments may be better understood with reference to the drawings and the accompanying description.

Figure 1:
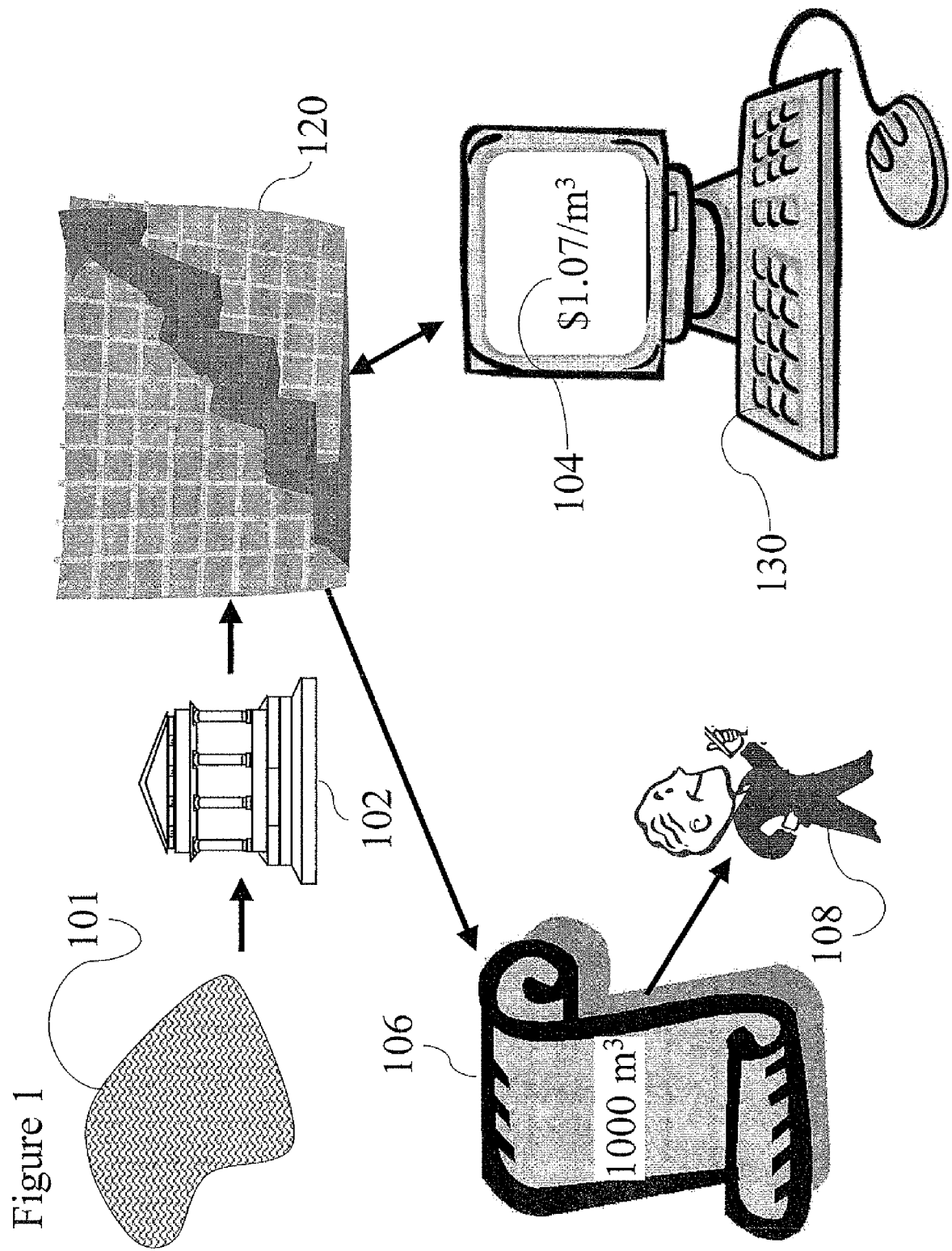
FIG. 1 is an illustration of an embodiment of an investment instrument.

Referring now to the drawings, FIG. 1 is an illustration of a financial instrument for investing in fresh water. Collateral 101 is a large body of fresh water owned by a municipality 102 (for example municipality 102 may be the state of Michigan and collateral 101 a lake). The substance of value in collateral 101 is fresh water. It will be understood to one skilled in the art, that although the water in collateral 101 has significant value and is easily available, nevertheless municipality 102 cannot be sell outright the water in collateral 101 due to legal limitations and limitations to pumping rates and the like. Nevertheless, Municipality 102 needs revenue and capital for development projects (including projects to protect or promote use of collateral 101 for example sewage treatment plants or building a marina or building a pumping station). Therefore municipality 102 markets water rights via a broker 120 and receives a commission as well as credits that can be used as security for loans.

The value of water in collateral 101 is difficult to evaluate because water trade is regulated by government legislation, licensing, official monopolies, taxes and subsidies. Therefore water is not freely marketable and has no consistent price. Therefore, broker 120 employs a standardized index 130, which is used to compute an index value 104 of water (for example $1.07/m^3$ as illustrated in the figure). In order to compute such a value broker 120 bases computations on the value of water in various localities as well as the virtual value of water in freely marketable products that contain water or utilize water in their production (examples are described herein below). Index values are stored in a memory of a desktop computer and calculated by the processor of the computer. Data for determining market shares and prices of products comes for statistics available over the Internet (for example statistics may be acquired from web sites associated with commodities markets, futures markets, stock exchanges [for example at N.Y., London, Tokyo]) and therefore can be updated easily in real time. Alternatively, statistics may be updated from periodically from published statistics or from statistics released from a government agency.

Broker 120 issues a certificate 106 (alternatively another financial instrument can be used for example a bond, a share, a stock, a future) for the water of collateral 101 and sells certificates 106 according to index value 104. In the example of FIG. 1, since index value 104 is $1.07/m$^3$ the broker 120 sells certificate 106 for 1000 m$^3$ for $1070 plus a 2% commission. An Investor 108 (who bought certificate 106) may redeem certificate 106 by requesting that municipality 102 deliver 1000 m$^3$ of water to investor 108 (investor 108 being responsible for transportation and handling cost), or investor 108 may hold onto certificate 106 assuming that index value 104 will rise and then investor 108 will sell certificate 106 to another investor (possibly via broker 120) and collect a profit (minus any brokerage charges).

Figure 2:
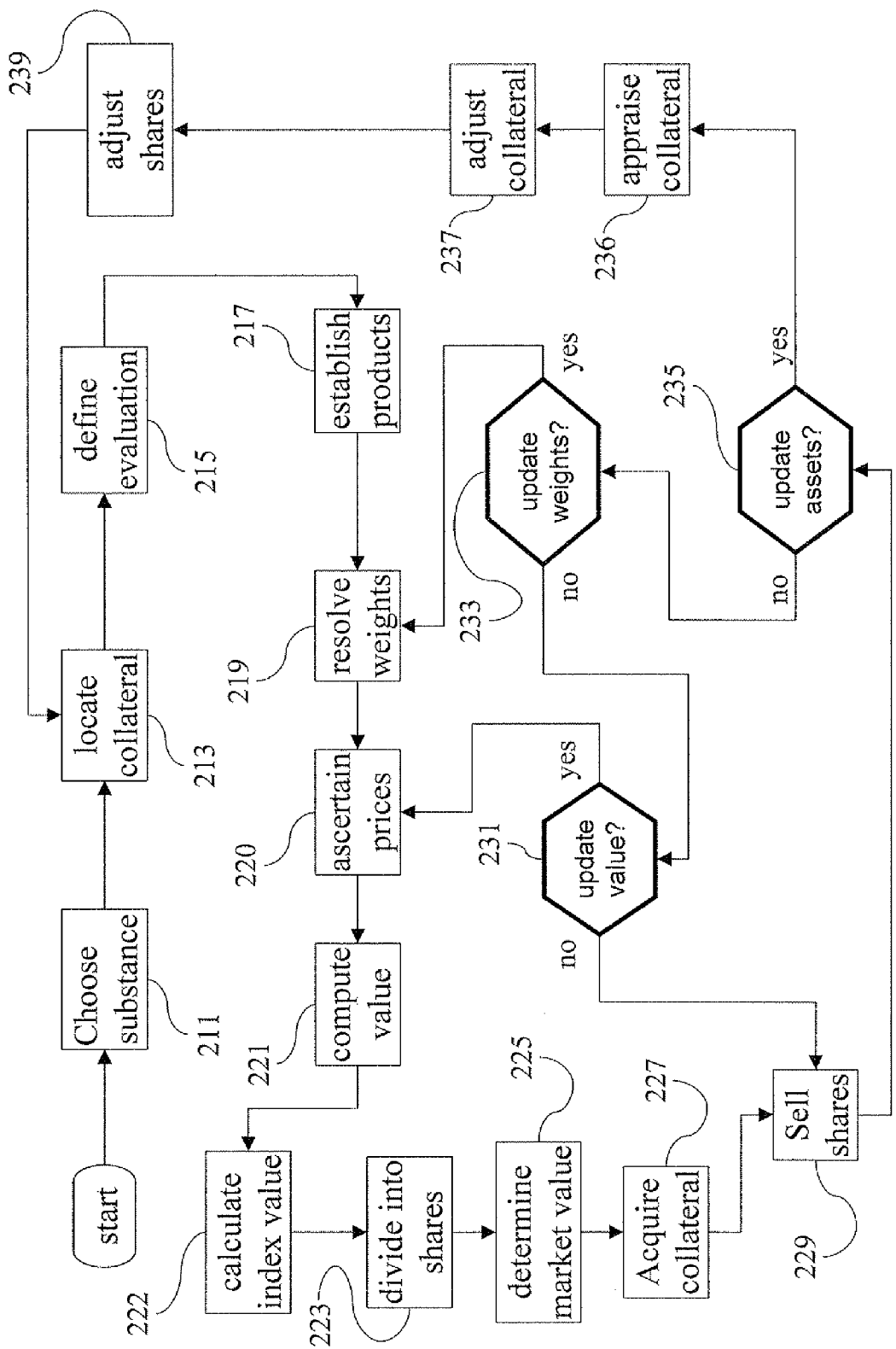
FIG. 2 is a generalized flowchart of a method of marketing a commodity.

FIG. 2 is a generalized flow chart of a method marketing a commodity. A broker searches for a resource that is under capitalized. For example there is a large quantity of fresh water available in the world and a need for the water but not enough capital to develop or even protect this resource. Therefore the broker chooses (block 211) to market fresh water. The broker must now locate (box 213) fresh water rights that can be acquired as collateral. In the example of FIG. 2 the broker finds that in Brazil there are a lot of natural lakes having large quantities of accessible water. Then it is necessary to define (box 215) a region of evaluation. For example it is possible to evaluate the water according to the value of water in Mexico and the Midwest United States (where there is a water shortage and water from the Amazon can easily be shipped) alternatively it is possible to evaluate the water according to the world price of water. The broker chooses to index fresh water according to the international value (worldwide) of water. Particularly, first the broker establishes (block 217) the main products of water in the world market and resolves (block 219) the weights for each product and ascertains (block 220) the price of each product and computes (box 221) the value of substance according to each product and calculates (box 222) an index value of the substance based on the compound price of the various products each weighted by its weight factor. An example of establishing (box 217) products resolving weights (box 219), ascertaining prices (box 220) computing a values (box 221) and calculating an index value (box 222) is illustrated hereinbelow in FIG. 3 and the accompanying description.

The broker then divides (box 223) the collateral into portions (for example a share which may be 1000 m3 of water, the collateral may be marketed using a share or another financial instrument as known in the art) and determines (box 225) a market value of each share according to the index value and the condition of the collateral (for example the price of the share may take into consideration the quality of the water in the lake or the location and accessibility of the water). For example if the index value is 1.07 usd/m3 and a share of the lake contains 1000 m3 then the market value of share may be 1070 usd. The broker then acquires (box 227) rights to market the collateral. For example the broker acquires (box 227) rights to the collateral by setting up a futures contract or supply contract with the municipality that owns a lake. Then the broker sells (box 229) shares to the collateral to an investor at the market value plus a commission.

The index value is sometimes updated. Particularly, periodically the algorithm checks (box 235) if it is time to update the state of the collateral (for example this may be done yearly or monthly or whenever there is a need to expand or adjust the index) if "yes" then a professional appraiser appraises (box 236) the collateral for the quantity, quality and availability of the water and the value of the collateral is adjusted (box 237) and then any new collateral necessary is located (box 213) the share certificates are adjusted (box 239) to make sure that each certificate is covered by valid assets and if necessary new collateral is located (box 213). If it is not time to adjust the collateral, ("no" in box 235) then the algorithm checks (box 233) if the time has comes to update the weights (Wx and Wx$_i$ [e.g. see FIG. 3 lines 362 and 363a-f respectively]) (for example this may be done monthly or even daily). If "yes" then the weights are resolved (box 219) according to periodic reports of international trade organization of the quantity of trade of various goods in the world. If "no" then the algorithm checks (box 231) if the time has come to update product prices (e.g. see FIG. 3 lines 364a-1). If "yes" then the price of a product is ascertained (box 220). The price of a product may be updated, daily, hourly or in real time according to commodity prices available on the Internet or from other source. If "no" then trading continues (for example selling 229 rights to the collateral).

FIG. 3 shows the results of example calculations of the weights of products and values of a commodity. In the example of FIG. 3, eight products (water products) are chosen 211. For each water product (A, Q, U, H, I, E, T, and B: Export, Domestic, Desalinate, Bottled, purify, Food Crops and Biofuel) the product weights Wx (line 362) are the portion of the water market represented by that product. Then for each product one or more representative cases are chosen. For each representative case a case weight Wx$_i$ (lines 363a-f) is resolved and a case value x$_i$ (lines 364a-f) is ascertained respectively.

In the example of FIG. 3, the broker resolves 219 by looking up trade data that in the chosen region 5% of the water trade is for export (Wa=0.05) and 50% goes to domestic consumption (Wq=0.5) and 9.95% comes from desalinization (Wu=0.0995), 0.05% is bottled (h=0.0005), 5% is purified (Wi=0.05), 20% is included as virtual water in food crops (Wt=0.2) and 10% is included as virtual water for production of biofuels Wb=0.1. Thus, in the example, the index price of water 369 is partially (W$_t$+W$_b$=30%) dependent on a virtual price of water.

Alternatively, the calculations for the index value could also include virtual water used in manufactured products such as paper (where water is used to suspend the wood colloids and in cleaning and finishing processes).

Concerning the agricultural portion, water is utilized in production of agricultural commodities such as orange juice corn etc. Nevertheless, it would be difficult to include irrigation water in the index calculations because 1) much irrigation water is taken directly from natural sources (private wells/rivers/rain) and never accounted for 2) irrigation water is highly regulated and subsidized. Virtual water refers to the volume of water utilized for a product but not actually part of the product. Between 700-3500 liters of crop water are utilized to produce one kilo of cereal. Therefore, buying agricultural commodities essentially includes purchasing water. By including the virtual price of water in agricultural commodities the broker determines a price for water that is dependent upon market forces where there is little government involvement influencing the price. This enables the broker to build a stable market based index value 369 for water.

A global market weight factor W is resolved 219 for each product. More specifically in the example of FIG. 3, the global market weight factors Wa, Wq, Wu, Wh, Wi, Wt, and Wb (line 262) (in the example of FIG. 3 the market weights are the market portion of Export, Domestic, Desalinate, Bottled, purify, Food Crops, and Biofuels Respectively) are computed based on a fixed algorithm using available statistics.

Note that in the embodiment of FIG. 3 $Wt_1$, $Wt_2$, $Wt_3$, (line 263e) (the case weights of virtual water in each food crop) are based on the quantity of water physically contained (the quantity of water constituent in the product) in the commodity and not oil the quantity of water utilized to produce the commodity. Thus for example a certain market includes in trade of food crops containing 1300 m³ of water. In that trade there are 500,000 Kg wheat (wheat is 60% water and the density of water is 1000 Kg/m³, thus 500,000 Kg wheat contains 500*0.6=300 m³ of water). Then $Wt_3$=(500*0.6)/1300=0.23. Similarly the total water market (the sum of the water traded in all of the chosen water products) is 6500 m3 and the total water contained in traded food crops is 1300 m3. Thus the market weight of virtual water of agriculture in the index value of water is the portion of the total water market contained in food crops Wt=1300/6500=0.2

In the example of FIG. 3 the virtual value 365a of water in food crops is computed as follows:

The commodity corn price in N.Y. is 400 usd/ton; corn contains 75% water and utilizes 1500 m3 irrigation water/ton—

$t_1$=400*0.75/1500=0.2 usd/m3 is the virtual value of water in corn.

The commodity coffee price in N.Y. is 950 usd/ton, and coffee is 55% water and utilizes 3500 m3 irrigation water/ton. Thus—

$t_2$=950*0.55/3500=0.15 usd/m3 is the virtual value of water in coffee.

the commodity wheat price in N.Y. is 500 usd/ton; wheat contains 60% water and utilizes 1000 m3 irrigation water per ton—

$t_3$=500*0.6/1000=0.3 usd/m3 is the virtual value of water in wheat.

Taking into consideration each commodity case weights (line 363e) from the total traded agricultural commodities will give us the virtual value for water in food crops, which is the T price T=$Wt_1$*$t_1$+$Wt_2$*$t_2$+$Wt_3$*$t_3$=0.27*$0.2+0.5*$0.15+0.23*$0.3=0.20 usd/m3 365a. Thus the virtual price of water in agricultural food products T is dependent on the market weight of each agricultural food product, the market price of the agricultural food product and on the quantity of water utilized in production.

By including the virtual value of water in the index formula the broker computes a representative integrated value of water including the unregulated trade of water in other commodities (products).

Also in the example of FIG. 3, for the product desalinated water U, it is found that in the chosen evaluation region (the world water trade) 647 m3 which is 9.95% of the total water trade is desalinated water. 20% of the worlds desalinated water is used by industrial cities $Wu_1$=0.20 and the chosen representative case is Perth Australia which produces desalinated water at a cost of $u_1$=0.80 usd/m². 50% of desalinated water use in the world is in vacation areas and islands $Wu_2$=0.50 and the chosen representative case is Bermuda, which produces desalinated water at a price of $u_2$=1.50 usd/m³. 30% of desalinated water use in the world is in oil exporting countries $Wu_3$=0.30 and the chosen representative case is Saudi Arabia, which produces desalinated water at a price of $u_3$=4.00 usd/m³. The weights are updated monthly while the representative prices are updated weekly. Thus the value for desalinated water U=$Wu_1$*$u_1$+$Wu_2$*$u_2$+$Wu_3$*$u_3$=0.2*$0.80+0.5*$1.50+0.3*$4.00=2.11 usd/m3 368.

Virtual water included in bio-fuels is another part of the water trade. In the example of FIG. 3, the combined market weight of three bio-fuels is 10% of the total world trade of water W=0.1.

Many fuels like bio-diesel (produced from waste oils or oily plants and particularly algae), biomethane (produced by anaerobic digestion of organic waste) and ethanol (produced from fermentation of cellulous waste or grain) contain no appreciable water. Therefore the water content of the fuel is not used to compute the weight factor Wb. Two examples of alternative bases of Wb are the total mass/volume of the biofuel or the quantity of water output from combustion of the bio-fuel. For liquid fuels (like bio-diesel and ethanol) the total volume or mass of the bio-fuels can used to compute the weight factor Wb. Alternatively for any bio-fuel and particularly for a gas (for example methane) where the volume and weight are not comparable to the water content or total volume of a liquid fuel, the mass of water output in combustion products may be used to compute Wb (alternatively for biofuel Wb could be based on the energy output by combustion of the fuel or some other combustion product or constituent [e.g. carbon] of the fuel multiplied by a proportionality factor). Thus the total market of bio-fuels includes 650 m3, which is treated as 10% of the total water trade 6500 m3. The volume of ethanol sold is 390 m3 ($Wb_1$=390/650=0.6) and the volume of bio-diesel sold is 260 m3 ($Wb_2$=195/650=0.3). In the example of FIG. 3 the quantity of the water market in biomethane (on which is based the weight factor $Wb_3$) is calculated based on the output of combustion of the methane. Use of combustion outputs to compute Wb can facilitate comparison between various biofuels that may have very different densities (alternatively energy production or carbon constituent other bases of comparison may be used). Particularly, in the example of FIG. 3 the market includes a trade of 38800 m3 of bio-methane. Methane has a density of 0.67 Kg/m3 at room temperature and burning 1 Kg of biomethane produces approximately 2.5 Kg of water. Therefore burning 38800 m3 of methane produces 38800*0.67*2.5/1000=65 m3 water. Thus $Wb_3$=65/650=0.1.

The virtual price of water in biofuel is based on the water input to production of the fuel. To produce 1 ton of ethanol from corn utilizes 3600 m3 of water and the price of ethanol is 800$/ton and thus the virtual value of water in ethanol is $b_1$=$800/3600=0.22 usd/m3. Similar calculations for biodiesel (where water is necessary for upkeep of algal ponds) give a virtual water value of $b_2$=0.15 usd/m3 water. In the example of FIG. 3 the virtual value of water in biomethane is based on the quantity of water utilized in production. The cost of methane is 3.00 usd/m3 and producing a m3 of biomethane utilizes 7.0 m3 of water (to keep the digester running) thus the virtual value of water in the bio-methane is $b_3$=3.0/7.0=0.43 usd/m3. Thus the combined virtual value of water in biofuel B is dependent on the market weight of each product (the total mass of the fuel or the water output in combustion of the fuel) and the quantity of water utilized in production of the fuel B=$Wb_1$*$b_1$+$Wb_2$*$b_2$+$Wb_3$*$b_3$=0.6*$0.22+0.3*$0.15+0.1*$0.43=0.22 usd/m3 365b.

Alternatively the $CO_2$ output from combusting the biofuel or the quantity of the carbon constituent in the biofuel could be used as a common basis of computing the weight factor of all the biofuels.

Once each product weight and the value of water in each product and class of products is computed the prices are multiplied by the respective weights giving a combined value. In the example of FIG. 3 the sum of Wa*A+Wq*Q+Wu*U+Wh*H+Wi*I+Wt*T+Wb*B=0.05*0.92+0.5*0.77+0.0995*2.11+0.0005*200+0.05*1.75+0.2*0.198+0.1*0.22= 0.89 usd/m3 366. This price is adjusted by adding a transport cost N=0.01 usd/m3 (for example the average cost of shipping water from the water source to the distributor) and all exit fee cost D=0.03 usd/m3 (for example the average exit fee paid by water importers for taking water from other municipalities) and E=−0.015 usd/m3 the recycle rate (taking account of the fact that some waste water re-enters the distribution system [by percolating into groundwater/running off into rivers/or via engineered water reuse]) giving an adjusted price of 0.91 usd/m3 367. Finally the final price is found by multiplying the adjusted price by a supply and demand factor Z=1.12 (when there are a lot of sellers of water certificates and few buyers the price is adjusted up and vice versa when the sellers outnumber the buyers) and a waste factor (1.05) which takes into account the increase of price to the consumer due to the loss of water between the source and the consumer. Thus the index value of water in the example of FIG. 3 is 1.07 usd/m3 369.

Using index value 369 of FIG. 3 (described above) companies get securities or purchase of water contracts for the value of the water at the index value. A company distributes contracts in the form of water basket stocks based on the water index value. A company can enter into agreements with finance institutions or investments houses—distributing water basket stocks for their clients and getting agreeable commissions and securities from the trading.

Alternatively a virtual value of a substance can also be computed based on a cost of a commodity for which there exists a product of the substance that is a substitute for the commodity. For example, it is possible to compute a virtual price for water from the price of gasoline. Since ethanol is a substitute for gasoline and since a major part of the cost of ethanol production is water, then it is possible to compute a virtual price of water based on the price of gasoline. For example since the price of gasoline is $700/ton and ethanol is a substitute for gasoline and since one can produce 1 ton of ethanol from corn which utilizes 3600 m3 of water to grow, then the virtual value of water based on the price of gasoline is $700/3600=B=0.19 usd/m3.

Figure 4:
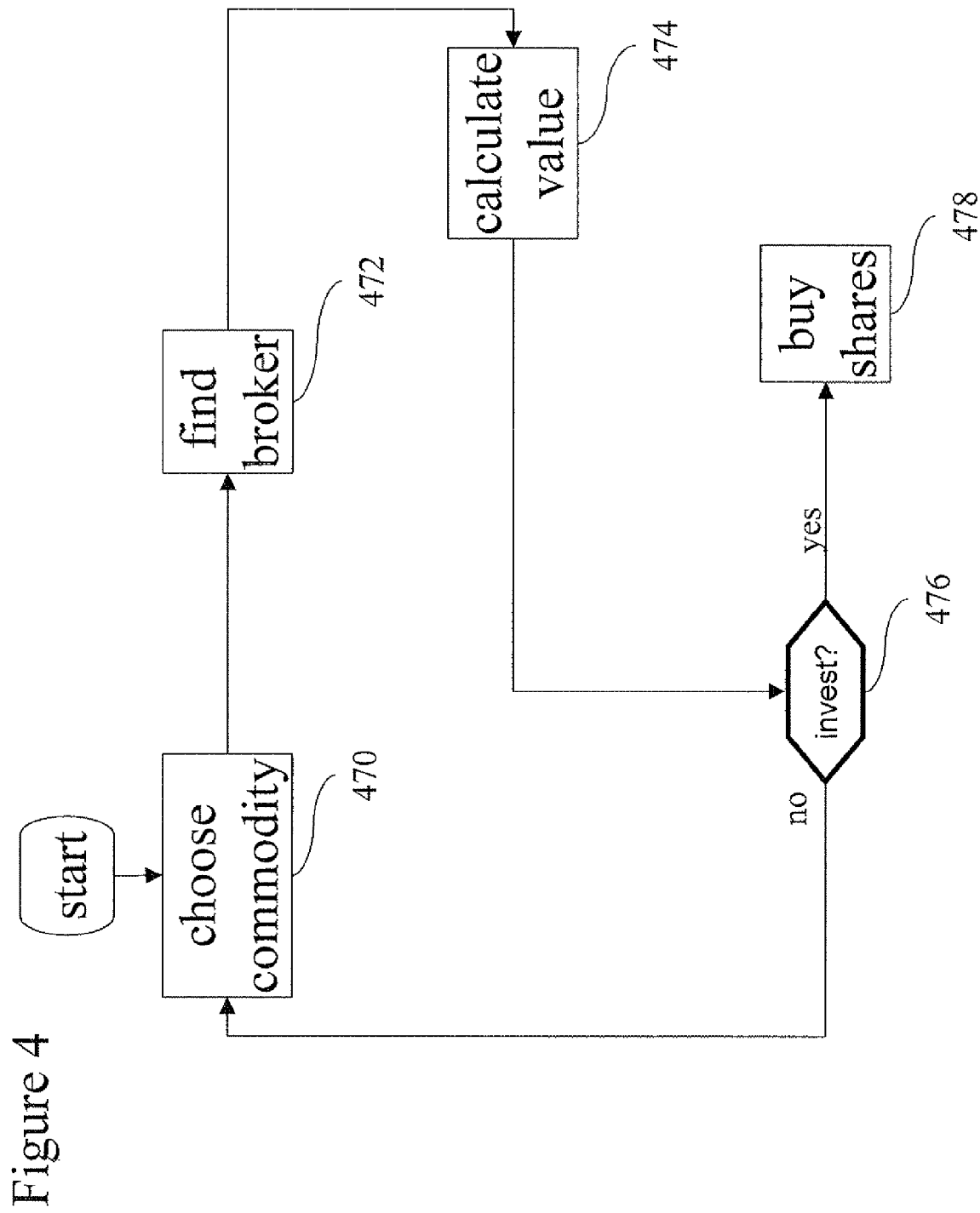
FIG. 4 is a generalized flowchart of a method of investing.

FIG. 4 is a flowchart illustrating a method of investing. An investor first chooses (box 470) a commodity (for example fresh water) in which to invest and then finds (box 472) a broker who is selling shares or other financial instrument (for example a bond, a certificate, a futures, a stock, a basket) in the commodity. Then the investor uses an index value to the commodity calculated (box 474) by the broker (for example index value 369 as described in FIG. 3 and the accompanying description). According to the calculated index value, the investor decides (box 476) whether to invest. If "yes" then the investor buys (box 478) shares from the broker. If "no" then the investor chooses (box 470) another commodity in which to invest.

In sum, although various example embodiments have been described in considerable detail, variations and modifications thereof and other embodiments are possible. Therefore, the spirit and scope of the appended claims is not limited to the description of the embodiments contained herein.

What is claimed is:

1. A method of using an investment instrument for investing in water, comprising:
   determining an index value of fresh water by using a computer processor to calculate the index value based on a quantity of said fresh water constituent in at least one product, based on a quantity of said fresh water utilized to produce said at least one product and based on a price of said at least one product; wherein the index value is computed by mathematically combining the quantity of said fresh water constituent in the at least one product, the quantity of said fresh water utilized to produce said at least one product and the price of said at least one product using one or more mathematical operations,
   determining a price of a financial instrument issuable for a particular amount of fresh water by using a computer processor to calculate the price from the index value of the fresh water and the particular amount of the fresh water; and
   issuing the financial instrument, the financial instrument identifying on its face the particular amount of fresh water.

2. The method of claim 1, wherein said at least one product is a publicly traded commodity.

3. The method of claim 2, wherein said at least one said product includes at least one agricultural commodity.

4. The method of claim 1, wherein said at least one product includes at least one of an agricultural commodity, a manufactured commodity and a fuel.

5. The method of claim 1 wherein said index value further depends on a quantity of an output from said at least one product and a quantity of a constituent of said at least one product.

6. The method of claim 1, wherein the quantity of said fresh water utilized to produce the at least one product excludes water that is part of the at least one product.

7. The method of claim 1, further comprising using the computer processor to calculate the index value based also on a market weight of the at least one product and wherein the price of said at least one product is the current price of the at least one product and wherein the market weight is the current market weight.

8. The method of claim 7, wherein the current price of the at least one product is updated in real time.

9. The method of claim 1, further comprising using the computer processor to calculate the index value based also on a market weight of the at least one product.

10. The method of claim 1, wherein the financial instrument is at least one of a certificate, a bond, a stock, a future.

11. The method of claim 1, wherein the financial instrument is a certificate.

12. The method of claim 1, further comprising using the fresh water as collateral for the amount of fresh water on the face of the financial instrument.

13. The method of claim 12, further comprising determining a market value of the collateral based on the index value of the fresh water.

14. The method of claim 1, further comprising issuing the financial instruments such that the particular amount of fresh water identified on the face of the financial instruments is redeemable by a holder of the financial instrument from an owner of the fresh water.

15. The method of claim 1, wherein the amount of fresh water is a volume of fresh water and wherein the index value is a price per unit volume.

16. A method of using financial instruments to invest in water, comprising:

determining, using a computer processor, a price of each of the financial instruments, each of the financial instruments identifying on its face a particular amount of fresh water, the price of each financial instrument determined using an index value of the fresh water and the particular amount of the fresh water, the index value of the fresh water determined based on a quantity of said fresh water constituent in at least one product, a quantity of said fresh water utilized to produce said at least one product and a price of said at least one product; wherein the index value of the fresh water is determined using the computer processor by using one or more mathematical operations to mathematically combine the quantity of said fresh water constituent in the at least one product, the quantity of said fresh water utilized to produce said at least one product and the price of said at least one product.

17. The method of claim 16, wherein said at least one product is a publicly traded commodity.

18. The method of claim 17, wherein said at least one said product includes at least one agricultural commodity.

19. The method of claim 16, wherein said at least one product includes at least one of an agricultural commodity, a manufactured commodity and a fuel.

20. The method of claim 16 wherein said index value further depends on a quantity of an output from said at least one product and a quantity of a constituent of said at least one product.

21. The method of claim 16, wherein the quantity of said fresh water utilized to produce the at least one product excludes water that is part of the at least one product.

22. The method of claim 16, further comprising using the computer processor to calculate the index value based also on a market weight of the at least one product and wherein the price of said at least one product is the current price of the at least one product and wherein the market weight is the current market weight.

23. The method of claim 22, wherein the current price of the at least one product is updated in real time.

24. The method of claim 16, further comprising the index value of the fresh water is determined by using the computer processor to calculate the index value based also on a market weight of the at least one product.

25. The method of claim 16, wherein the financial instruments comprise at least one of a certificate, a bond, a stock, a future.

26. The method of claim 16, wherein the financial instruments are certificates.

27. The method of claim 16, further comprising using the fresh water as collateral for the amount of fresh water on the face of each of the financial instruments.

28. The method of claim 16, further comprising determining a market value of the collateral based on the index value of the fresh water.

29. The method of claim 16, further comprising issuing the financial instruments such that the particular amount of fresh water identified on the face of the financial instruments is redeemable by a holder of the financial instrument from an owner of the fresh water.

30. The method of claim 16, wherein the amount of fresh water is a volume of fresh water and wherein the index value is a price per unit volume.

31. The method of claim 16, further comprising issuing the financial instruments.

32. The method of claim 16, further comprising updating the index value.

* * * * *

UNITED STATES PATENT AND TRADEMARK OFFICE
CERTIFICATE OF CORRECTION

| | | |
|---|---|---|
| PATENT NO. | : 8,024,239 B2 | Page 1 of 1 |
| APPLICATION NO. | : 12/194551 | |
| DATED | : September 20, 2011 | |
| INVENTOR(S) | : Yaacov Shirazi | |

It is certified that error appears in the above-identified patent and that said Letters Patent is hereby corrected as shown below:

Column 10, claim 14:

Line 61 should be corrected as follows:
change

--financial instruments....-- to

"financial instrument...."

Column 10, claim 14:

Line 62 should be corrected as follows:
Change:

--financial instruments....-- to

"financial instrument...."

Signed and Sealed this
Eighth Day of November, 2011

David J. Kappos
*Director of the United States Patent and Trademark Office*